United States Patent
Rijnveld et al.

(10) Patent No.: US 9,488,247 B2
(45) Date of Patent: Nov. 8, 2016

(54) ACTIVE VIBRATION ISOLATION AND DAMPING SYSTEM

(75) Inventors: Niek Rijnveld, The Hague (NL); Teunis Cornelis van den Dool, Delft (NL)

(73) Assignee: MECAL B.V., Enschede (NL)

( * ) Notice: Subject to any disclaimer, the term of this patent is extended or adjusted under 35 U.S.C. 154(b) by 776 days.

(21) Appl. No.: 13/377,402

(22) PCT Filed: Jun. 11, 2010

(86) PCT No.: PCT/NL2010/050360
§ 371 (c)(1),
(2), (4) Date: Feb. 21, 2012

(87) PCT Pub. No.: WO2010/143959
PCT Pub. Date: Dec. 16, 2010

(65) Prior Publication Data
US 2012/0158191 A1    Jun. 21, 2012

(30) Foreign Application Priority Data
Jun. 12, 2009   (EP) ................................. 09162607

(51) Int. Cl.
*G05B 13/00* (2006.01)
*F16F 15/02* (2006.01)
*G05D 19/02* (2006.01)

(52) U.S. Cl.
CPC ............... *F16F 15/02* (2013.01); *G05D 19/02* (2013.01)

(58) Field of Classification Search
CPC ...... F16F 15/02; F16F 15/03; F16F 2228/06; F16F 15/0275; F16F 1/12

USPC ......................................................... 700/280
See application file for complete search history.

(56) References Cited

U.S. PATENT DOCUMENTS 5,823,307 A    10/1998    Schubert et al.
5,884,892 A *   3/1999    Gassen et al. ................ 248/635
(Continued)

FOREIGN PATENT DOCUMENTS

EP          0391130        3/1990
EP          0748951       12/1996
(Continued)

OTHER PUBLICATIONS

Giazotto, "Tilt meter as a tilt-independent accelerometer", Dec. 2011, pp. 667-670.*
(Continued)

*Primary Examiner* — Kenneth M Lo
*Assistant Examiner* — Olvin Lopez Alvarez
(74) *Attorney, Agent, or Firm* — Patterson Intellectual Property Law, P.C.; James R. Cartiglia; Timothy L. Capria (57) ABSTRACT

An active vibration isolation and damping system (11) comprising a payload (12) that has to be isolated or damped, a vibration sensor (14) for detecting a vibration of the payload, an actuator (15) for moving the payload relative to a bearing body (13) supporting the payload, and a controller (16) for providing the actuator with a signal that is representative for the vibration. The system provides a solution for the tilting problem by applying a vibration sensor that has a low stiffness connection to the payload (12) for rotation along an axis (17) perpendicular to the gravitational force (18), and a high stiffness connection to the payload (12) for the vibration detectable with the vibration sensor.

13 Claims, 10 Drawing Sheets

(56) References Cited

U.S. PATENT DOCUMENTS

| | | | |
|---|---|---|---|
| 6,021,991 A * | 2/2000 | Mayama et al. | 248/550 |
| 6,196,514 B1 * | 3/2001 | Kienholz | F16F 15/0275 244/164 |
| 6,226,075 B1 * | 5/2001 | Loopstra et al. | 355/76 |
| 6,408,767 B1 * | 6/2002 | Binnard et al. | 108/20 |
| 6,518,721 B2 * | 2/2003 | Mayama | 318/632 |
| 6,681,152 B1 * | 1/2004 | Remington et al. | 700/280 |
| 6,894,449 B2 * | 5/2005 | Nishi | 318/114 |
| 6,926,263 B1 * | 8/2005 | Nelson | 267/64.23 |
| 7,398,143 B2 * | 7/2008 | Stothers et al. | 701/37 |
| 7,505,369 B2 * | 3/2009 | Hagedoorn | 367/183 |
| 7,726,452 B2 * | 6/2010 | Kraner | 188/378 |
| 8,256,735 B2 * | 9/2012 | Heiland | F16F 15/0275 108/20 |
| 8,857,834 B2 * | 10/2014 | Van der Knaap et al. | 280/124.106 |
| 2002/0139988 A1 | 10/2002 | Kato | |
| 2003/0098965 A1 * | 5/2003 | Binnard | G03F 7/707 355/73 |
| 2004/0041315 A1 * | 3/2004 | Noe | 267/136 |
| 2005/0201206 A1 * | 9/2005 | Luc | 367/182 |
| 2006/0106500 A1 * | 5/2006 | Allaei | 700/280 |
| 2006/0272910 A1 * | 12/2006 | Kraner | F16F 15/027 188/266.7 |
| 2007/0024829 A1 * | 2/2007 | Mizuno | 355/18 |
| 2008/0006759 A1 * | 1/2008 | Heiland | 248/638 |
| 2008/0173090 A1 * | 7/2008 | Van Kann et al. | 73/383 |
| 2009/0202373 A1 * | 8/2009 | Williams | F04B 35/045 417/437 |
| 2010/0001445 A1 * | 1/2010 | Maruyama et al. | 267/113 |
| 2010/0321662 A1 * | 12/2010 | Butler | G03F 7/70766 355/67 |
| 2010/0332159 A1 * | 12/2010 | Gortzen et al. | 702/56 |
| 2011/0126630 A1 * | 6/2011 | Fraanje et al. | 73/654 |
| 2011/0127400 A1 * | 6/2011 | Kastelijn et al. | 248/550 |
| 2014/0209778 A1 * | 7/2014 | Evers | 248/550 |

FOREIGN PATENT DOCUMENTS

| | | | | |
|---|---|---|---|---|
| EP | 1803967 | | 7/2007 | |
| EP | 1870614 | | 12/2007 | |
| JP | 8-167553 | * | 6/1996 | H01L 21/027 |
| JP | 2000065853 | | 3/2000 | |
| JP | 2003-280744 | * | 10/2003 | G05D 3/12 |
| JP | 2003280744 | | 10/2003 | |
| TW | I269686 | | 1/2007 | |
| WO | WO98/06960 | | 2/1998 | |
| WO | WO2004/029475 | | 4/2004 | |
| WO | WO2005/047728 | | 5/2005 | |
| WO | WO 2009084963 | * | 7/2009 | F16F 15/02 |

OTHER PUBLICATIONS

Nelson, "An active vibration isolation system for inertial reference and precision measurement", Jun. 1991, pp. 2069-2075.*
Hua, "Low Frequency Vibration Isolation and Alignment System for Advanced LIGO", Jun. 2005, pp. 178.*
Yong et al, "Design, Identification, and Control of a Flexure-Based XY Stage for Fast Nanoscale Positioning", Jan. 2009, IIEEE Transactions on Nanotechnology, vol. 8, No. 1, pp. 46-54.*
PCT/NL2010/050360 International Preliminary Report on Patentability, mailing date Dec. 12, 2011, pp. 5.
PCT/NL2010/050360 International Search Report, mailing date Sep. 17, 2010, pp. 4.
Written Opinion of the International Searching Authority for PCT/NL2010/050360, mailed Sep. 17, 2010, pp. 4.

* cited by examiner

ACTIVE VIBRATION ISOLATION AND DAMPING SYSTEM

The present invention relates to an active vibration isolation and damping system comprising a payload that has to be isolated or damped, a vibration sensor for detecting a vibration of the payload, an actuator for moving the payload relative to a bearing body supporting the payload, and a controller for providing the actuator with a signal that is representative for the vibration.

STATE OF THE ART

Earth vibrations and other mechanical disturbances are becoming more and more a limiting factor for applications that demand an environment that is free of such disturbing vibrations. Space equipment under development on earth, demands a test environment that is similar to the working environment in space. The further decreasing dimensions as foreseen for semiconductor products like processors and memories, demand a better stability of the lithographic equipment that is used for the fabrication of these products than is available at present. In addition, vibrations are preventing further improvement of the resolution of electron and atomic force microscopes. Simple passive methods to isolate a platform or a payload and the load placed thereon from earth vibrations by using mechanical springs, elastomers, air bearings or magnetic bearings do not meet the current demands.

Active control on the basis of a measurement of the vibration allows a better isolation from undesired vibrations than passive isolation, without increasing the compliance as in (passive or active) isolation techniques that only adjust the stiffness coupling between the source, e.g. the floor, of the vibration and the payload. Active vibration control systems compensate for the actual mechanical disturbance. A sensor set-up capable of detecting the undesired vibration can be placed either on the source of the vibration (often the ground or floor) or on the payload that has to be isolated from earth vibrations or other mechanical disturbances. The vibration of the payload with respect to the floor or a supporting structure or with respect to an inertial reference mass, is detected mechanically, electrically, optically or electro-magnetically. For this purpose the sensor may comprise commonly known means for detecting acceleration, velocity or position or distance. The payload is supported by springs or other bearings and it can be driven by an actuator like a servomotor along the sensitive axis of the sensor. The electronic output of the sensor is (filtered and) fed back to the actuator that compensates for the undesired vibration.

International patent application WO 2004/029475 discloses a system and method for active vibration isolation and cancellation. Vibration sensors measure the vibrations of the payload in a certain direction relative to an inertial reference mass that is compliantly attached to the payload. The measured vibration signal is fed into a controller that calculates the force that has to be applied in that direction. The sensors used, typically exhibit a compliance (high stiffness) in one direction for detecting the vibrations in that direction. More in particular, sensors may have one translational degree of freedom. European patent application publication EP 1 870 614 A1 discloses such an active vibration isolation system comprising a sensor and an actuator wherein the effective axis of the sensor and the effective axis of actuator are essentially parallel. It is known to those skilled in the art that several sensor and actuator combinations can be made to obtain vibration isolation for more than one degree of freedom.

To obtain a good vibration isolation with small amplitude, vibration sensors are preferably placed on or fixed to the payload that has to be isolated. More specifically, active vibration systems in which an absolute vibration sensor is applied comprising an inertial reference mass, allow a good vibration isolation at low frequencies. The reference mass is connected to a sensor frame. The displacement of the mass relative to the sensor frame may be recorded in one translational degree of freedom. If no dynamic forces are exerted directly on the reference mass in the direction of measurement, other than through the stiffness coupling to the sensor frame, the recorded signal is a measure of absolute vibration of the sensor frame in this direction. Due to the high stiffness coupling in all degrees of freedom between the sensor frame and the payload, the sensor however, translates and rotates in the same way as the payload.

When a vibration sensor measures vibrations with a horizontal degree of freedom, the gravitational force (or gravitation vector) is perpendicular to the direction of measurement. This means that the sensor, due to the absence of an additional degree of freedom, is not sensitive to this vertical force. In the case that the sensor comprises an inertial reference mass, this mass encounters no displacement due to the gravitational force in the direction of measurement, viz. in horizontal direction. The problem that arises from stiffness coupling between the sensor, more particular the sensor housing, and the payload is called the "horizontal tilting problem" because this problem mainly arises when the payload and consequently also the sensor exhibit a rotating vibration along a horizontal axis.

When the payload tilts around a horizontal axis, the direction of measurement tilts in the same way. In the tilted orientation, the reference mass does indeed encounter a displacement in the direction of measurement due to the gravity force. This means that for the degree of freedom in which the payload tilts around a horizontal axis, the measured vibration in the horizontal direction is not valid as an absolute vibration anymore. The disturbances on the payload in the tilting direction cause a false vibration signal in a different horizontal direction, degrading the performance of the vibration isolation in this direction.

International patent application WO 2005/047728 discloses a horizontal-motion vibration isolation system that can attain low horizontal natural frequencies. The bearing members (columns) of this system are rigid members between the payload and the frame, comprising tilt mechanisms having a stiffness for tilt rotation about a horizontal axis and allowing horizontal translation of the payload. The application discloses a spring-mass system with a single degree of freedom which system can attenuate vibrations between the payload and the frame above a certain frequency This passive systems prevents passively the tilting of the pay load for instance because a mass is placed close to one of the bearing members of the payload. It does not provide the level of vibration isolation that can be obtained by active vibration isolation.

There are sensors known for measuring the tilt of a payload. Such a complicated sensor is disclosed for instance in J. Winterflood, Z. B. Zhou, L. Lu and D. G. Blair, *Tilt suppression for ultra-low residual motion vibration isolation in gravitational wave detection*, Physics Letter A 277 (2000) pp. 143-155. This specially designed sensor comprises a laser beam that is bounced forth and back between mirrored surfaces into a quadrant photo-diode. Such a sensor can be applied in an active vibration system but it does not provide a relatively simple solution.

It is an objective of the present invention to provide an active vibration isolation and damping system with an improved isolation of the payload from disturbing vibration imposed by the environment on the payload and an improved damping of vibrations of the payload.

The objective of the invention is obtained by a system as defined above comprising a vibration sensor having a low stiffness connection to the payload for rotation along an axis perpendicular to the gravitational force, and having a high stiffness connection to the payload for the vibration detectable with the vibration sensor.

The effect of the low stiffness connection to the payload for rotation along an axis perpendicular to the gravitational force is that a tilting of the payload will not result in an additional force on the vibration sensor in the direction of the measurement. So actually the sensor is decoupled from tilting vibrations. In an active vibration system according to the state of the art, the additional force will be interpreted as a vibration with a degree of freedom different from the rotation. In such an active vibration isolation system comprising a vibration sensor that is designed to measure for instance horizontal vibrations, the tilting vibration will, erroneously, be interpreted as a horizontal vibration of the payload. As a consequence, the controller of the system according to the state of the art will give a signal to a horizontal actuator to displace the payload horizontally. The decoupling according to the invention prevents such an erroneous displacement.

The present invention is based on the insight that a further improvement of already known active vibration isolation systems is possible when the movement of the relevant vibration sensor is at least partially decoupled from the movements of the payload.

A high stiffness connection of a vibration sensor for a certain degree of freedom means that the sensor follows or measures mainly the vibration of the payload, frame, bearing body or ground in that particular degree of freedom. A high stiffness in horizontal direction, for instance, means that the sensor follows or measures the horizontal displacement of the bearing on which it is fixed rather precisely within a certain range of frequencies. Typically, a high stiffness connection will result in a resonance frequency that is higher than 25 Hz.

A low stiffness connection of a vibration sensor for a certain degree of freedom means that the sensor is mainly independent of the vibration of the payload, frame, bearing body or ground in that particular degree of freedom. A low stiffness connection for rotation around an axis, for instance, means that the sensor does not or only in an insignificant measure follow or measure that rotation within a certain range of frequencies. Typically, a low stiffness connection is more than a factor ten lower than the high stiffness connection.

DETAILED DESCRIPTION OF THE FIGURES

Figure 1:
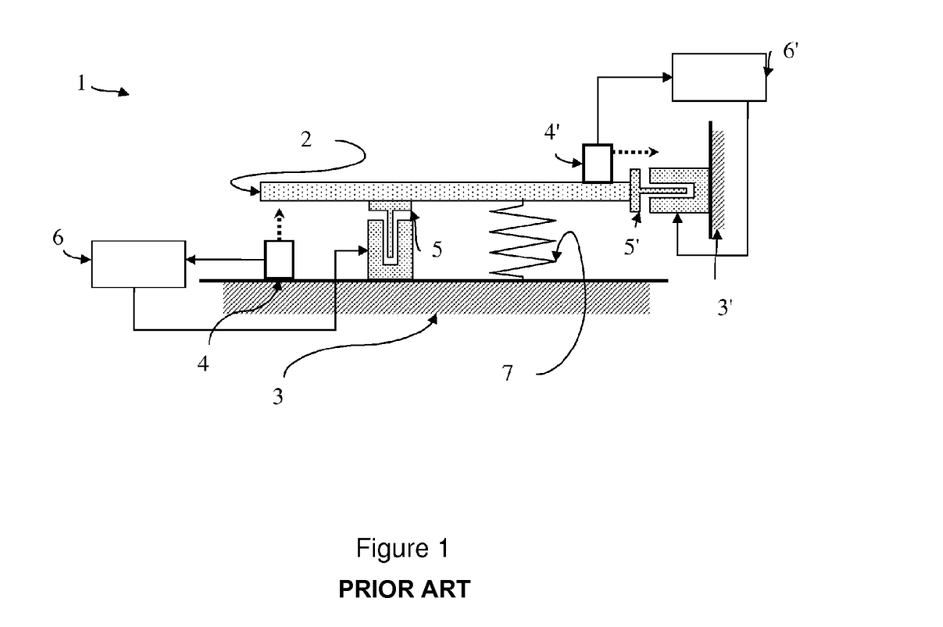
FIG. 1 shows schematically an active vibration isolation and damping system according to the state of the art.

FIG. 1 shows schematically an active vibration isolation and damping system according to the state of the art. Such a system comprises a payload (2) that has to be isolated or damped, a bearing body (3, 3') supporting the payload, at least one vibration sensor (4 or 4') for detecting a vibration of the payload, at least one actuator (5 or 5') for moving the payload, and a controller (6 or 6') for providing the actuator with a signal that is representative for the vibration with the related degree of freedom (translational or rotational direction). The vibration sensor (4') might be placed on or fixed to the payload (2) or the sensor (4) might be placed on or fixed to the bearing body (3) for measuring the relative displacement of the payload with respect to the bearing body. The payload may be supported by conventional suspensions (7) like mechanical springs or elastomers. The bearing body might be any supporting structure for the payload, including a frame, a floor, a wall or a ceiling. The actuator is placed on or fixed to the bearing body. This actuator might be a piezo-electric actuator e.g. of a piezo-ceramic type, a magnetostrictive motor, a Lorentz motor (voice coil) or any type of position actuator or motor.

Figure 2:
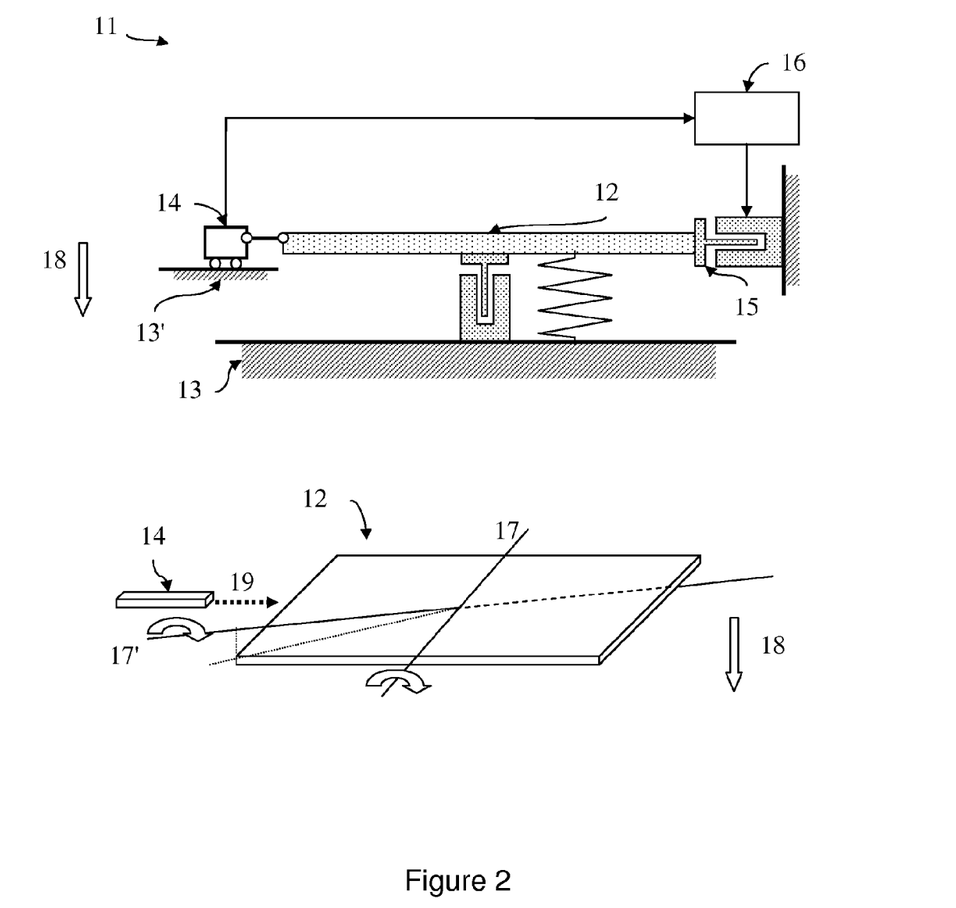
FIG. 2 shows schematically an embodiment of an active vibration isolation and damping system according to the invention with one vibration sensor fixed to a frame supporting the payload for most degrees of freedom.

FIG. 2 shows schematically an embodiment of an active vibration isolation and damping system according to the invention in which the horizontal vibration is isolated or damped. The vibration sensor (14) is fixed to a frame (13') for all degrees of freedom except a translation in the horizontal direction. This frame might be the frame (13) supporting the payload. The vibration sensor is stiffly connected to the payload for measuring the horizontal translation of the payload. A signal that is representative for the horizontal vibration is sent to a controller (16). It may satisfy when the vibration sensor measures the vibration in one degree of freedom only, as long as the disturbing tilting vibration axis (17, 17') has a component perpendicular to the measuring direction (19) of the sensor (14). Although this tilting vibration axis might be perpendicular to the measuring direction and laying in the plane of the payload as illustrated by axis (17), it is understood that any rotation along an axis having a component perpendicular to the direction of the gravitational force (18), like for instance axis (17') will result in a rotation along axis (17). Only one vibration sensor is shown in the figure. However, two or three vibration sensors are preferred when the tilting can be in any direction. The horizontal vibrations are damped by at least one actuator (15) receiving an input signal from a controller (16).

The vibrations in the remaining degrees of freedom can be measured by vibration sensors known to those skilled in the art. These sensors are preferably placed on the payload but the sensors can also be placed on the floor supporting the payload. The horizontal vibration sensor can therefore be connected to the payload only in its measurement direction, for instance through a double hinge or a flexible beam. The other five degrees of freedom of this vibration sensor can be connected rigidly to the ground through a linear guidance. This linear guidance can be designed such that it allows motion of the vibration sensor frame in the direction of measurement, but prevents motion of the vibration sensor frame in other directions, including tilting of the vibration sensor when the payload tilts.

Figure 3:
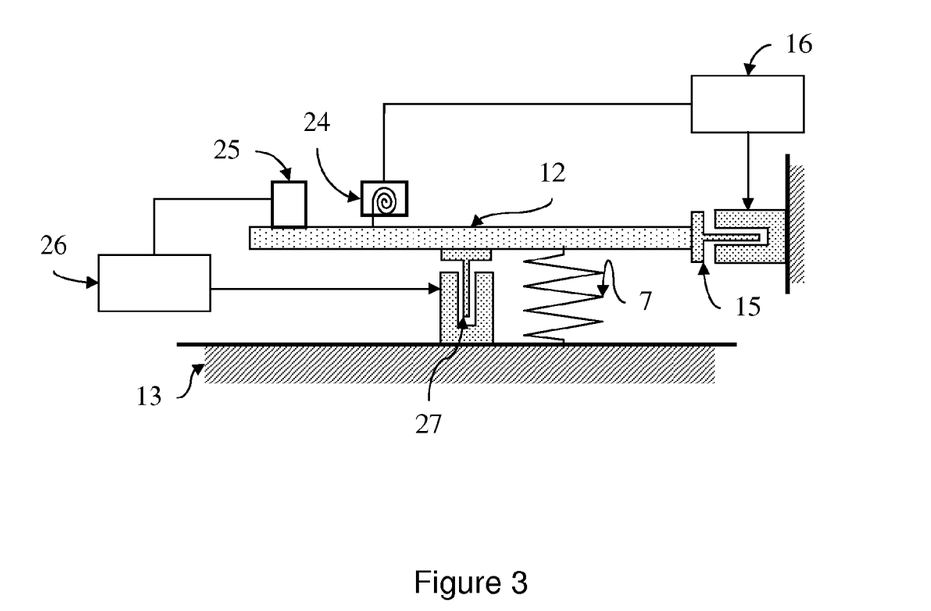
FIG. 3 shows schematically an embodiment of an active vibration isolation and damping system according to the invention with one vibration sensor fixed to the payload for most degrees of freedom.

FIG. 3 shows schematically an other embodiment of an active vibration isolation and damping system according to the invention comprising a first vibration sensor (24) that is connected with a high stiffness to the payload for not more than five degrees of freedom and that is designed for measuring horizontal vibrations. This first vibration sensor is decoupled from the tilting of the payload. A signal that is representative for the horizontal vibration of the payload is sent to a controller (16) that controls the displacement of the horizontal actuator (15). The system further comprises a second vibration sensor (25) that is designed for measuring vibrations in another degree of freedom, for instance for detecting vertical vibrations. This second sensor need not to be decoupled from the tilting vibration, although it might be. A signal that is representative for the vertical vibration of the payload is sent to a controller (26) that controls the displacement of a vertical actuator (27). It is understood that the two controllers might be combined into one electronic circuit to control the displacement of the different actuators. Although the vibration sensors might be of any type, vibration sensors comprising a inertial reference mass might be preferred in systems for isolating and damping vibration with a low frequency, for instance frequencies below 0.2 Hz. In such sensors the reference mass is connected with a low stiffness to its housing for the degree of freedom detectable with the vibration sensor. Due to the low stiffness connection to the housing of the sensor, the reference mass is an inertial mass for the vibrations to be detected.

Figure 4:
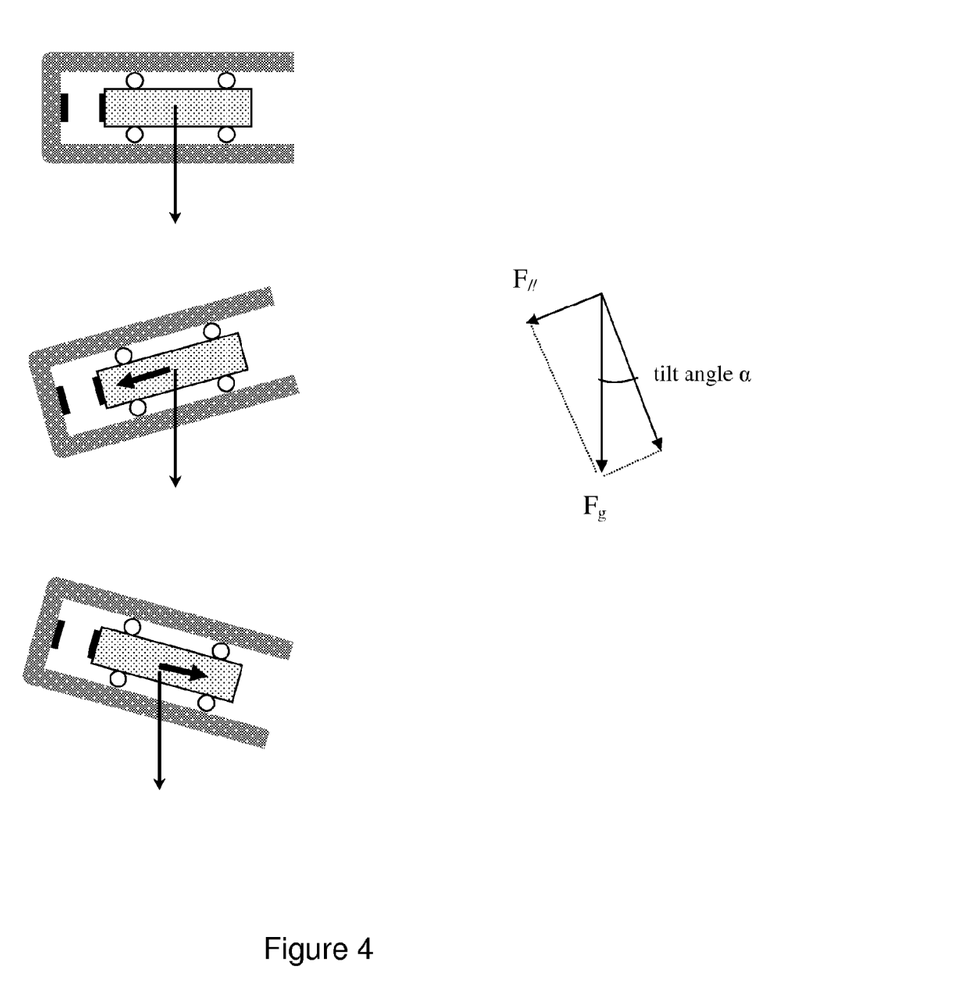
FIG. 4 illustrates the particular relevance of the invention for horizontal vibrations.

FIG. 4 illustrates the particular relevance of the invention for horizontal vibrations. When a vibration sensor for measuring the horizontal vibrations tilts with an amplitude having an angle α than this tilting results in an additional force along the axis of the sensor (the assumed horizontal direction) equal to the gravitational force times the sine of the tilt angle: $F_{//}=F_g*\sin(\alpha)$. For small tilting amplitudes this results in a force that is linear proportional to the gravitational force. For vertical vibration sensors, the additional force is proportional to the cosine of the tilt angle. So although the same effect occurs, the impact on the active vibration isolation is much less. Such a force, that is typically a few orders of magnitude less than for the horizontal vibration, can be neglected for the small angles that are typical for the most common disturbances.

Figure 5:
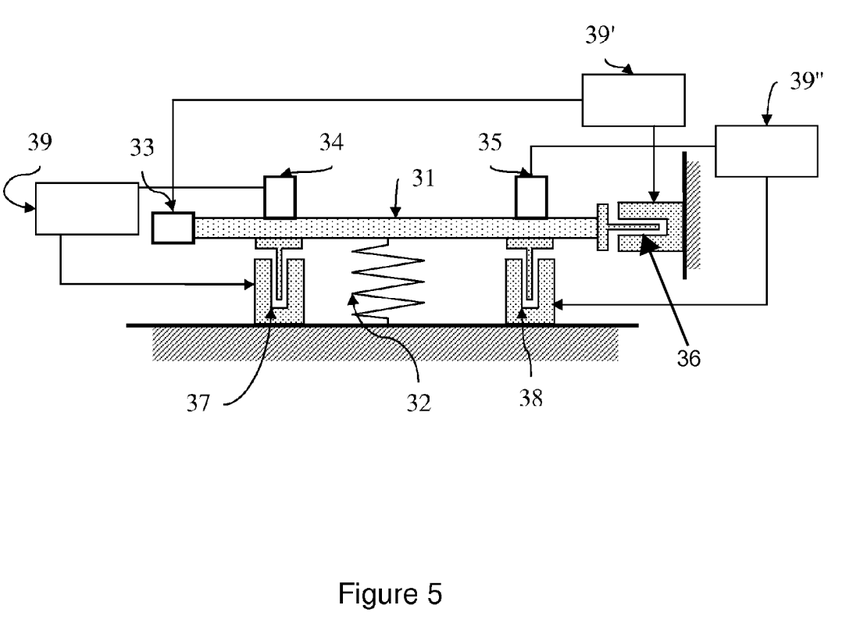
FIG. 5 shows schematically an embodiment of an active vibration isolation and damping system according to the invention with additional sensors.

FIG. 5 shows schematically an embodiment of an active vibration isolation and damping system according to the invention with additional sensors. With this embodiment, the advantageous properties of an active vibration isolation and damping systems according to the invention will be illustrated. The embodiment comprises a rigid payload (31) that can move in one horizontal direction, one vertical direction and that can rotate around the axis perpendicular to both the horizontal and the vertical translations. The payload is connected to the rigid world by a 5 Hz suspension (32) for all degrees of freedom, viz. in all translational and rotational directions. The active vibration system comprises three vibration sensors placed at an arm of the centre of gravity. Two vibration sensors (34, 35) can detect vertical vibrations and one sensor (33) can detect a horizontal vibration. All three the sensors have a corresponding force actuator (36, 37,38) aligned in the same direction, that can apply a force to the payload. The actuators are controlled by one or more controllers (39, 39', 39").

Figure 6:
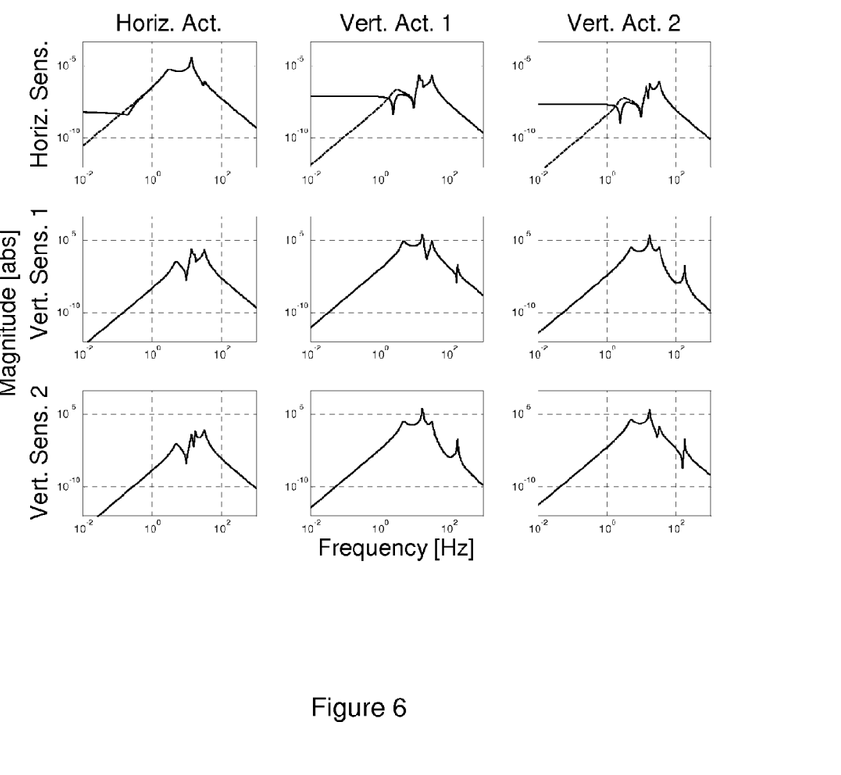
FIG. 6 shows model calculations for the open loop transfer functions of actuator to sensor, illustrating the performance of the embodiment shown in FIG. 5.

FIG. 6 shows model calculations for the open loop transfer functions of actuator to sensor, illustrating the performance of the embodiment shown in FIG. 5. For these model calculations the three sensors are modeled as linearly guided mass spring systems. In this model, the performance of the inertial feedback system can be predicted by closing the control loop between the corresponding sensors and actuators. Two cases are simulated. One case representing the state of the art for active vibration systems, illustrating the gravity effect on the sensors. the other case representing the situation for a system according to the invention. For this later simulation the gravitational force is omitted.

The open loop transfer functions of each actuator to each sensor are shown. The solid line represents the state of the art situation in which gravity effects are included, and the dashed line represents the invention in which no gravity effects are included. In the low frequency region of the horizontal sensor, there is a clear difference between the gravity and no gravity case; in the gravity case, the low frequency gain in combination with the phase around the crossover frequency introduces a limit to the loop gain that can be obtained. In this example, the maximum obtainable loop gain when the gravity effects are included is around 35 dB. The maximum obtainable loop gain in the case where the gravity effects are not included is unlimited in this model; in practice it will be limited only by sensor noise and/or higher resonances.

Figure 7:
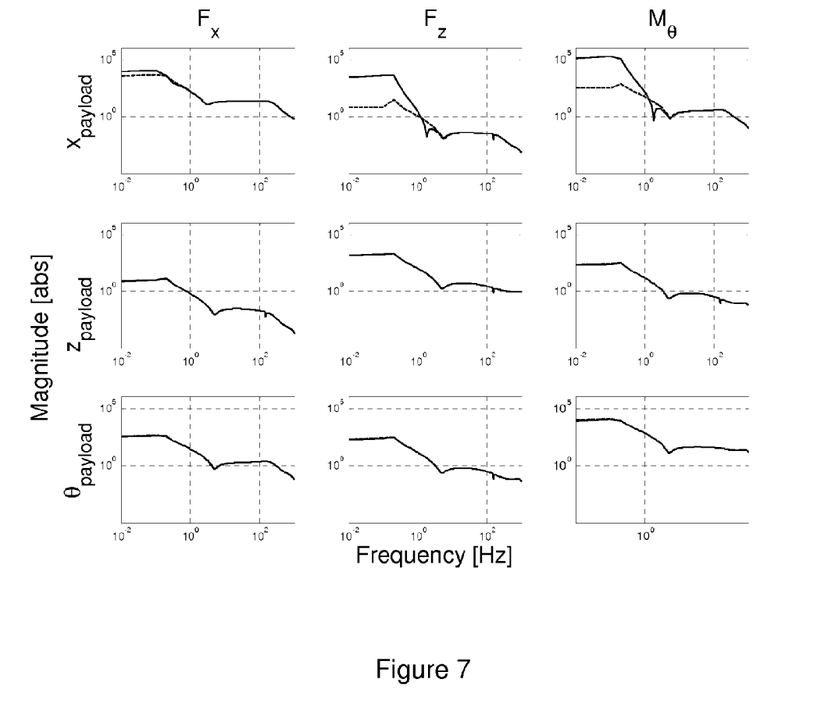
FIG. 7 shows model calculations for the closed loop transfer functions of disturbance forces to motion of the centre of gravity of the payload, illustrating the performance of the embodiment shown in FIG. 5.

FIG. 7 shows model calculations for the closed loop transfer functions of disturbance forces to motion of the centre of gravity of the payload, illustrating the performance of the embodiment shown in FIG. 5. These model calculations are based on the same assumptions as those shown in FIG. 6. Again, the solid line represents the case in which gravity effects are included (the state of the art systems), and the dashed line represents the case in which no gravity effects are included (systems according to the invention). In this simulation, the same (gravity limited) controller is applied.

The diagonal transfer functions are comparable between the cases. However, in the off-diagonal terms between the moment $M_\theta$ around the horizontal axis, the force $F_z$ in vertical direction and the motion $x_{payload}$ of the payload in horizontal direction, a dramatic increase of compliance is visible. This means that when applying a moment (or a force at an arm of the center of mass) in this frequency band, the response of the table in terms of horizontal motion of the center of gravity is significantly larger than the actual transfer between a horizontal force and horizontal motion. With gravity effects included, the performance of the inertial feedback system in terms of absolute motion of the payload is significantly reduced by an increased compliance in one of the off-diagonal terms. Without gravity effects, or by implementing the proposed solution, the performance in the low frequency band can be as good as the passive suspension of the payload.

Figure 8:
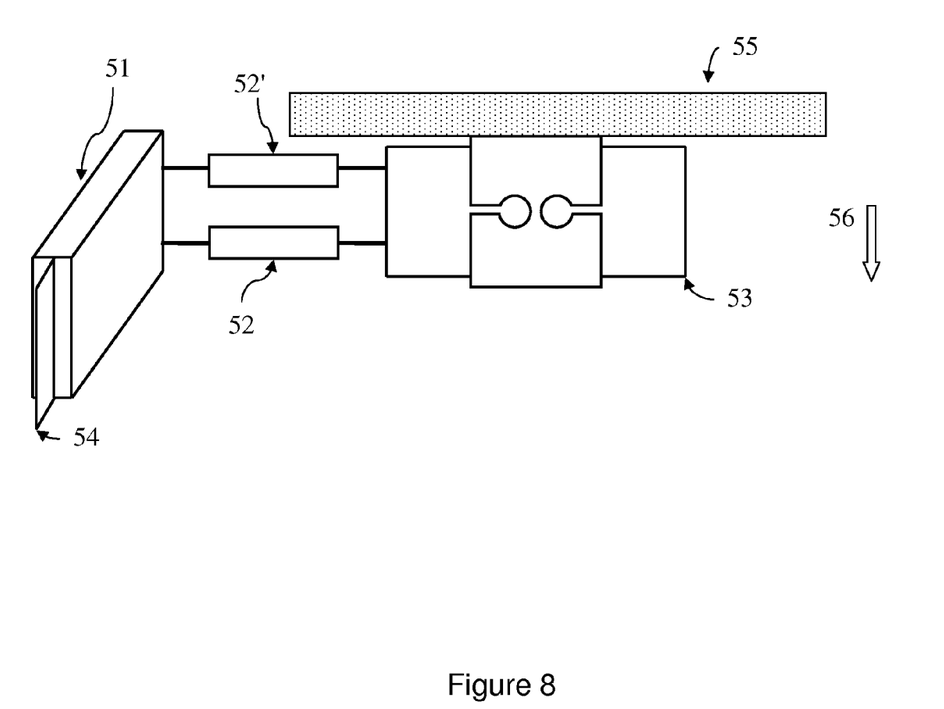
FIG. 8 is a schematic illustration for an embodiment for realizing the high rotational stiffness.

FIG. 8 is a schematic illustration for an embodiment for realizing the high rotational stiffness for the connection to the bearing body, for example a frame, and a low stiffness for the connection to the payload. Through three flexure mechanisms, each comprising a rigid body (51) on a hinge (54) fixed to the frame, and two flexible beams (52, 52'), the horizontal sensors (53) have a high rotational stiffness connection to the frame. For the other degrees of freedom the sensor is stiffly connected to the payload. The axes of rotation are perpendicular to both the gravity vector (56) and the direction of measurement of the horizontal vibration sensor detecting the horizontal displacement of the payload (55).

Figure 9:
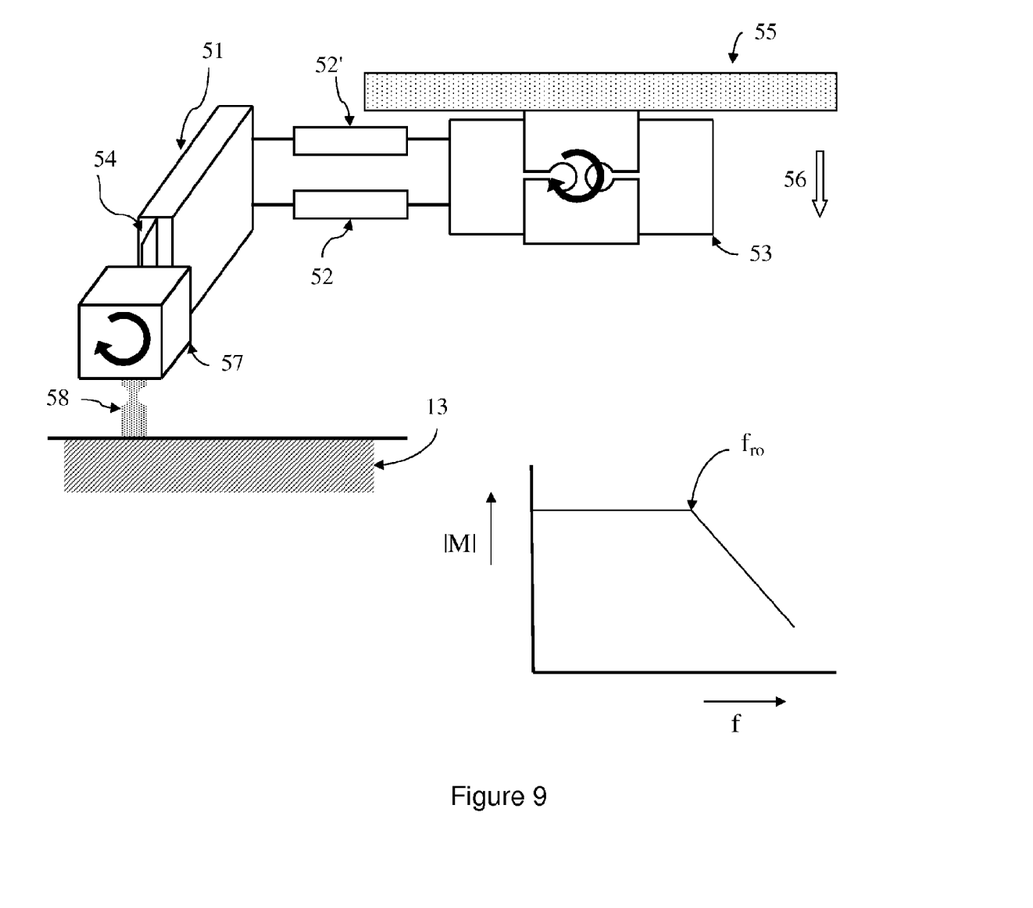
FIG. 9 is a schematic illustration for an embodiment with different rotational stiffnesses at low and high frequencies

It may be preferred to combine a reduced low frequency tilting effect, viz. a stiff connection of the sensor to the frame, with a weaker coupling between the frame and the vibration sensor at high frequencies. Such an effect can be obtained with an auxiliary mass situated between the sensor and the frame. An embodiment of such a system is shown in FIG. 9. In this embodiment the hinge (54) is not attached to the frame but to an auxiliary mass (57). This auxiliary mass (57) is further connected with a rotational stiffness (58) to the frame (13), whereas the rotation axis of the mass is in parallel with the rotation axis of the sensor (53). The frequency $f_{ro}$ at which the coupling (IMI) between the rotation of the auxiliary mass and the rotation of the sensor rolls off can be adjusted by the auxiliary mass (typically between 1 and 100 kg) and the two rotational stiffnesses. Typically, the rotational stiffness of the auxiliary mass for rotation relative to the frame will be at least an order of magnitude larger than the rotational stiffness of the sensor relative to the auxiliary mass.

Figure 10:
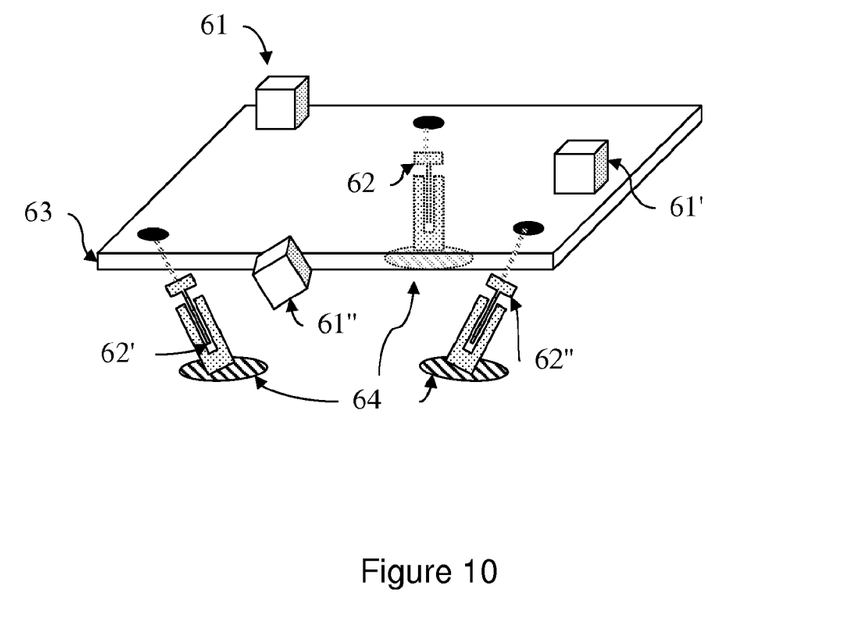
FIG. 10 illustrates one possible orientation of sensors and actuators in the active vibration isolation and damping system.

FIG. 10 illustrates one possible orientation of sensors (61, 61', 61") and actuators (62, 62', 62") in the active vibration isolation and damping system. The actuators are placed on the ground or fixed to a frame (64) bearing the payload (63). In a system comprising more than one sensor/actuator combination, the sensor and actuator need not to have the same degree of freedom. This means that the measuring direction of a sensor need not to correspond to a displacement direction of any of the actuators. A sensor (61") may even be tilted with a fixed angle to the gravitational force.

The present invention is in particular suited for platforms that are used to support instruments under test, e.g. instruments for space applications. However, the present invention can also be used for vibration isolation in a large variety of equipment, including but not limited to telescopes, lithographic machineries and cars. The system is suited to isolate the payload from external vibrations, originating for instance from the ground. In addition, this system is also suited to damp vibrations originating from the payload itself, i.e. equipment containing moving parts or persons handling the equipment. Vibrations are all type of movements, displacements or rotations, either periodically or not. So, the invention not only relates to isolating the payload from vibrations originating from its environment but also to counteracting vibrations originating from other sources like the equipment that is placed on the payload.

The active vibration isolation system comprises at least one sensor for detecting the vibrations of the payload that has to be isolated or damped. The sensor need not to detect vibrations in all spatial directions. In practice it might be preferred to use sensors that have only a limited number of degrees of freedom, for instance one or two.

It is noted that any terms used in this document should not be construed so as to limit the scope of the present invention. In particular, the words "comprise(s)" and "comprising" are not meant to exclude any elements not specifically stated. Single elements or components may be substituted with multiple elements or components or with their equivalents.

It will be understood by those skilled in the art that the present invention is not limited to the embodiments illustrated above and that many modifications and additions may be made without departing from the scope of the invention as defined in the appending claims.

The invention claimed is:

1. An active vibration isolation and damping system comprising:
    a payload that has to be isolated or damped,
    a vibration sensor connected with a high stiffness connection to the payload for not more than five degrees of freedom, wherein the high stiffness connection has a resonance frequency of higher than 25 Hz, wherein the vibration sensor is designed for measuring a horizontal vibration of the payload perpendicular to the direction of gravitational force, wherein at least one of the degrees of freedom of the high stiffness connection between the vibration sensor and the payload is in the horizontal measuring direction to allow the vibration sensor to follow and measure the horizontal vibrations of the payload, wherein the vibration sensor is decoupled from a tilting of the payload, wherein the decoupling between the vibration sensor and the payload is provided by the high stiffness connection also having a relatively low stiffness in a tilting direction perpendicular to the direction of gravitational force of the payload such that a tilting of the payload does not result in an additional force on the vibration sensor in the measuring direction, wherein the low stiffness has a resonance frequency lower than the high stiffness resonance frequency by more than a factor ten,
    an actuator for moving the payload relative to a bearing body supporting the payload, and
    a controller for providing the actuator with a signal that is representative for the horizontal vibration of the payload.

2. An active vibration isolation and damping system according to claim 1, wherein the system comprises at least one additional vibration sensor.

3. A system according to claim 2, the at least one additional vibration sensor is suitable for measuring vibration in the direction of the gravitational force.

4. A system according to claim 3, wherein at least one of the vibration sensors comprises an inertial reference mass.

5. A system according to claim 2, wherein at least one of the vibration sensors comprises an inertial reference mass.

6. A system according to claim 1, wherein the actuator is a Lorentz actuator.

7. The system according to claim 1, wherein the vibration sensor is connected to the payload through a double hinge or flexible beam.

8. The system according to claim 1, comprising a frame that is separate from the payload, wherein the vibration sensor is fixed to the frame for all degrees of freedom except a translation in the horizontal measuring direction.

9. The system according to claim 8, wherein the frame comprises a linear guidance.

10. The system according to claim 8, wherein the frame is a frame supporting the payload.

11. The system according to claim 1, wherein the vibration sensor comprises an inertial reference mass, wherein the reference mass is connected with a low stiffness to its housing for a horizontal degree of freedom detectable with the vibration sensor.

12. The system according to claim 1, wherein the system is configured for isolating and damping vibrations with a low frequency below 0.2 Hz, wherein the reference inertial mass is an inertial mass for the said low frequency.

13. The system according to claim 1, wherein the horizontal vibrations are along an axis perpendicular to the gravitational force.

* * * * *